United States Patent
Bertran et al.

(10) Patent No.: US 9,618,999 B1
(45) Date of Patent: Apr. 11, 2017

(54) IDLE-AWARE MARGIN ADAPTION

(71) Applicant: International Business Machines Corporation, Armonk, NY (US)

(72) Inventors: Ramon M. Bertran, Manhattan, NY (US); Pradip Bose, Yorktown Heights, NY (US); Alper Buyuktosunoglu, White Plains, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/943,166

(22) Filed: Nov. 17, 2015

(51) Int. Cl.
*G06F 1/32* (2006.01)

(52) U.S. Cl.
CPC .......... *G06F 1/3206* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 6,711,447 B1 | 3/2004 | Saeed | |
| 7,716,006 B2 | 5/2010 | Coskun et al. | |
| 8,245,070 B2 | 8/2012 | Finkelstein et al. | |
| 9,009,508 B2 | 4/2015 | Beck | |
| 2007/0260899 A1* | 11/2007 | Burton | G06F 1/26 713/300 |
| 2008/0100328 A1* | 5/2008 | Dhong | G01R 31/3004 324/750.3 |
| 2008/0276026 A1* | 11/2008 | Branover | G06F 1/324 710/260 |
| 2009/0092391 A1* | 4/2009 | Zong | H04B 10/07955 398/79 |
| 2009/0228845 A1* | 9/2009 | Ito | G06F 17/5063 716/136 |
| 2012/0117403 A1* | 5/2012 | Bieswanger | G06F 1/3206 713/322 |

(Continued)

FOREIGN PATENT DOCUMENTS

WO 2007077516 A1 7/2007

OTHER PUBLICATIONS

A. Bacha, et al., "Dynamic Reduction of Voltage Margins by Leveraging On-chip ECC in Itanium II Processors," ISCA-40, Jun. 2013, Tel-Aviv, Israel, 11 pages.

(Continued)

*Primary Examiner* — Kim Huynh
*Assistant Examiner* — Paul J Yen
(74) *Attorney, Agent, or Firm* — Cantor Colburn LLP (57) ABSTRACT

Monitoring is performed for a requested change in a number of active processor cores within a multi-core processor. A current power level setting of the multi-core processor is checked based on the requested change in the number of active processor cores. A targeted power level setting associated with the requested change in the number of active processor cores is determined, where the targeted power level setting incorporates a worst case noise level margin defined on an active processor core basis. The current power level setting is adjusted to align with the targeted power level based on determining that the current power level setting fails to meet the targeted power level within a threshold band.

15 Claims, 5 Drawing Sheets

(56) References Cited

U.S. PATENT DOCUMENTS

2014/0125401 A1   5/2014 Xu
2014/0258765 A1   9/2014 Persson

OTHER PUBLICATIONS

C. Lefurgy, et al., "Active Management of Timing Guardband to Save Energy in POWER7," MICRO 44, Dec. 2011, Porto Alegre, Brazil, 11 pages.
Herbert et al., "Variation-Aware Dynamic Voltage/Frequency Scaling," IEEE, Feb. 2009, 12 pages.
K. Hazelwood, et al., "Eliminating Voltage Emergencies via Microarchitectural Voltage Control Feedback and Dynamic Optimization," ISLPED, Aug. 2004, Newport Beach, CA, 6 pages.
M. Powell, et al., "Pipeline Muffling and a Priori Current Ramping: Architectural Techniques to Reduce High-Frequency Inductive Noise," ISLPED, Aug. 2003, Seoul, Korea, 6 pages.
M. S. Gupta, et al., "Towards a Software Approach to Mitigate Voltage Emergencies," ISLPED, Aug. 2007, Portland, Oregon, 6 pages.

\* cited by examiner

IDLE-AWARE MARGIN ADAPTION

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The present application relates generally to computer system performance adaption. More specifically, the present application is directed to idle-aware margin adaption in a multi-core processing system.

Computer systems can dynamically adjust voltage and frequency settings during execution as part of power management. As one example, dynamic voltage and frequency scaling (DVFS) can be applied to scale voltage and frequency for a processor as part of power management. Typically, a processor that is idling without a workload can operate at a reduced power level achieved by adjusting voltage and/or frequency. However, altering voltage and/or frequency can increase susceptibility to noise events that may impact system reliability. Conversely, operating at a much higher power level than needed reduced power efficiency of the system.

SUMMARY

A method includes monitoring for a requested change in a number of active processor cores within a multi-core processor. A current power level setting of the multi-core processor is checked based on the requested change in the number of active processor cores. A targeted power level setting associated with the requested change in the number of active processor cores is determined, where the targeted power level setting incorporates a worst case noise level margin defined on an active processor core basis. The current power level setting is adjusted to align with the targeted power level based on determining that the current power level setting fails to meet the targeted power level within a threshold band.

Embodiments also include a computer system that includes a multi-core processor, a power control, and a resource manager. The resource manager monitors for a requested change in a number of active processor cores within the multi-core processor and checks a current power level setting of the multi-core processor based on the requested change in the number of active processor cores. The resource manager determines a targeted power level setting associated with the requested change in the number of active processor cores, where the targeted power level setting incorporates a worst case noise level margin defined on an active processor core basis. The resource manager also adjusts the current power level setting using the power control to align the current power level setting with the targeted power level based on determining that the current power level setting fails to meet the targeted power level within a threshold band.

Embodiments also include a computer program product. The computer program product includes a computer readable storage medium having computer readable program code embodied therewith. The program instructions are executable by a multi-core processor to cause the multi-core processor to monitor for a requested change in a number of active processor cores within the multi-core processor and check a current power level setting of the multi-core processor based on the requested change in the number of active processor cores. A targeted power level setting associated with the requested change in the number of active processor cores is determined, where the targeted power level setting incorporates a worst case noise level margin defined on an active processor core basis. The current power level setting is adjusted to align with the targeted power level based on determining that the current power level setting fails to meet the targeted power level within a threshold band.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems, methods and computer program products for idle-aware margin adaption in a multi-core processing system. Embodiments can derive a worst-case noise curve as a function of the number of cores active in a multi-core processor. A resource manager of the multi-core processor can adjust a safety guard-band to maintain reliability and gain efficiency by increasing frequency, reducing voltage, or both. Using stressmark analysis offline, a maximum noise level that can be generated based on the number of cores can be computed. The computed maximum noise level based on the number of cores is used to dynamically adjust a current power level of a multi-core processing system during operation to perform margin adjustments that remain within a threshold band of expected maximum limits without being overly conservative. For example, if all cores of a multi-core processor are in use, a margin reduction may not be performed based on maximum worst case predictions. However, as the number of active cores is reduced, the noise guardband can be reduced to reflect a lower maximum noise for the number of active cores as determined during system analysis. The noise guardband can be reflected in a targeted power level setting that incorporates a worst case noise level margin defined on an active processor core basis. In one embodiment, a maximum noise level of about 27% with six cores active is reduced to about 9% when only one core is active, which is about a 3× reduction of maximum noise level. Thus, if a guardband of about 200 millivolts is established when six cores are active, the guardband may be reduced by a factor of three to about 66 millivolts for a single active core. Power adjustments for guardbands may be achieved by commanding a power control to change frequency and/or voltage.

Figure 1:
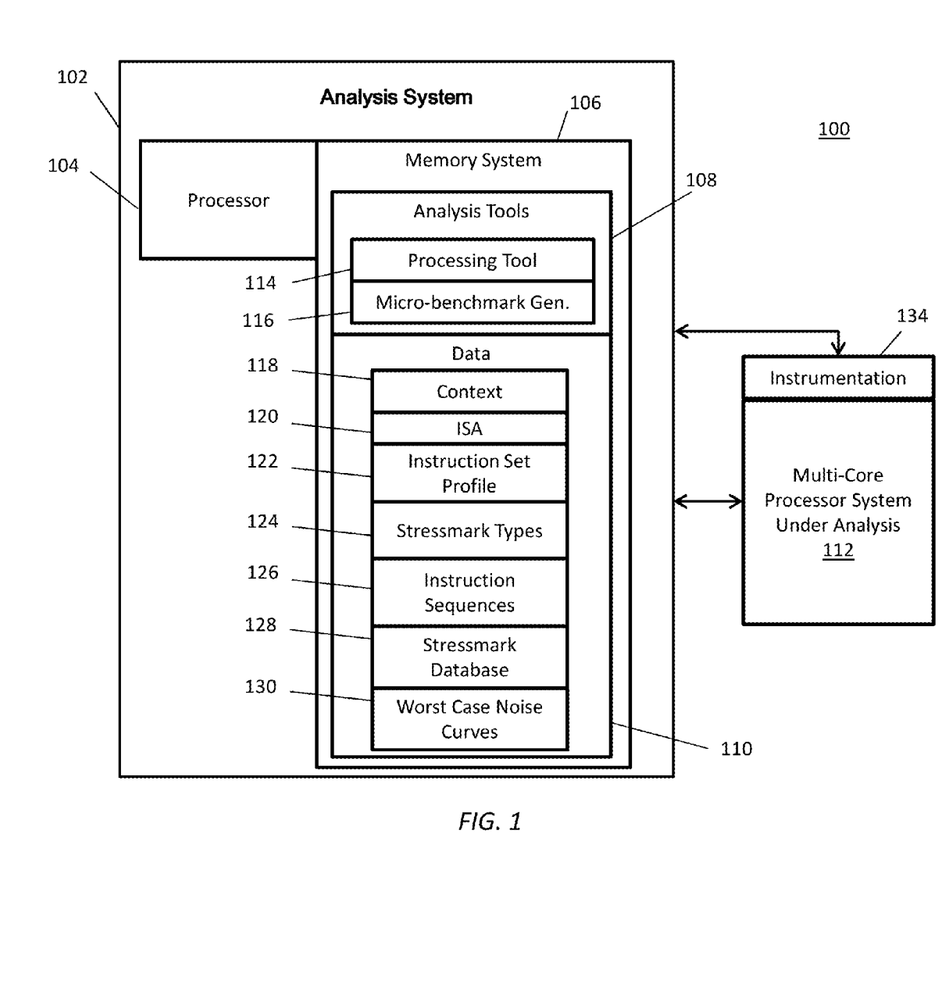
FIG. 1 is an exemplary diagram of an analysis system in which aspects of the exemplary embodiments may be implemented.
Figure 2:
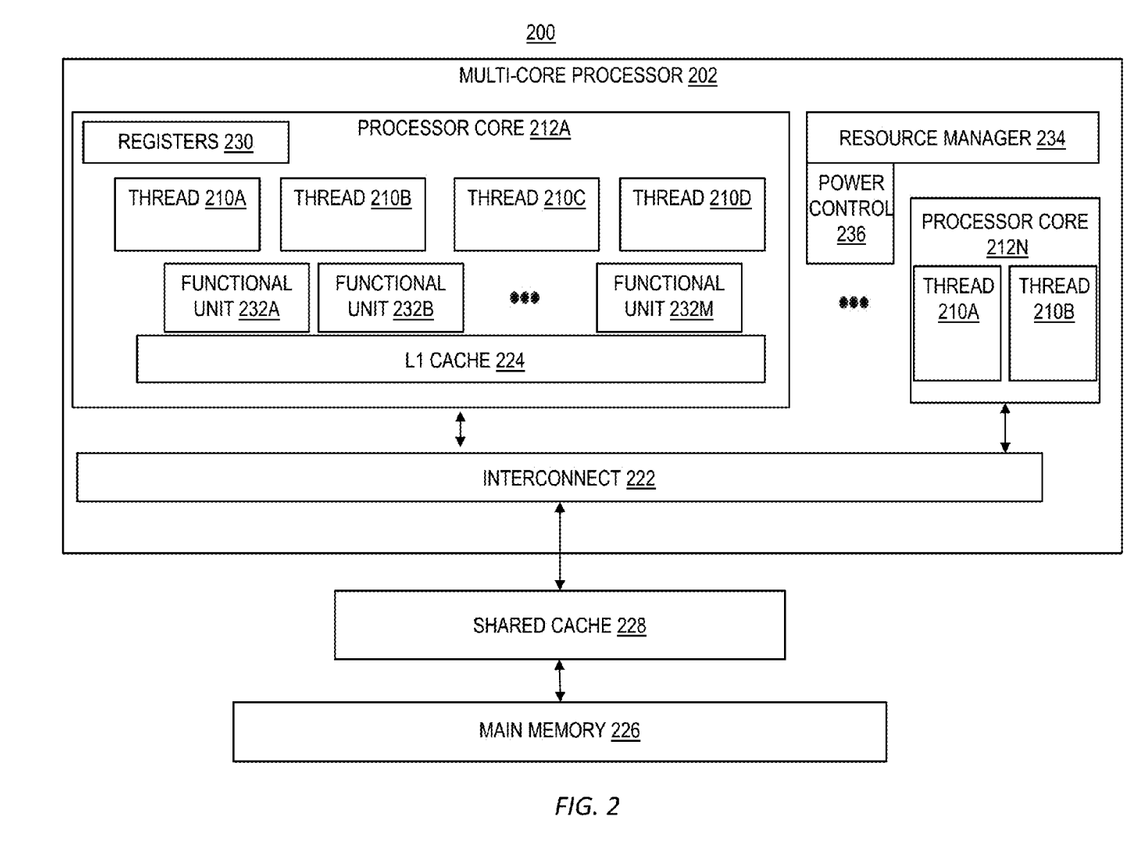
FIG. 2 is an exemplary block diagram of a computer system in accordance with an embodiment.

The exemplary embodiments may be implemented for a variety of processors of various computing devices. For example, exemplary embodiments may be used for any of a server computing device, client computing device, communication device, portable computing device, or the like. FIGS. 1-2 are provided hereafter as examples of an analysis system and a multi-core processing system in which exemplary aspects of the illustrative embodiments may be implemented. FIGS. 1-2 are only exemplary and are not intended to state or imply any limitation with regard to the types of computing devices in which the illustrative embodiments may be implemented.

Turning now to FIG. 1, a system 100 is generally shown that includes an analysis system 102 configured to generate and apply stressmarks on a multi-core processor system under analysis 112. The multi-core processor system under analysis 112 can be a physical system or a simulated system. For example, the multi-core processor system under analysis 112 may be in raw wafer form (that is, as a single wafer that has multiple unpackaged chips), as a bare die, or in a packaged form. In the latter case the multi-core processor system under analysis 112 can be mounted in a single chip package (such as a plastic carrier, with leads that are affixed to a motherboard or other higher level carrier) or in a multichip package (such as a ceramic carrier that has either or both surface interconnections or buried interconnections). The multi-core processor system under analysis 112 may also be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. FIG. 2 depicts one example of elements that may be incorporated within the multi-core processor system under analysis 112 regardless of physical packaging or level of physical realization.

Continuing with the description of FIG. 1, the analysis system 102 includes a processor 104 and a memory system 106 (also referred to as memory 106). The processor 104 can be any type of processing circuitry or microcontroller, including multiple instances thereof, that is configurable to execute processes further described herein, where the memory system 106 is an example of a tangible storage medium. The memory system 106 can include analysis tools 108 and data 110. The analysis tools 108 may be partitioned as one or more computer program products. For example, the analysis tools 108 can include a processing tool 114 and a micro-benchmark generator 116 among other executable applications (not depicted). The data 110 can include a variety of records, files, and databases, such as a configuration context 118, an instruction set architecture (ISA) 120, an instruction set profile 122, stressmark types 124, instruction sequences 126, a stressmark database 128, worst case noise curves 130, and other data (not depicted) as further described herein.

In an exemplary embodiment, the processor 104 is coupled to the memory system 106, and the processor 104 is configured to execute the analysis tools 108 to analyze the ISA 120 of the multi-core processor system under analysis 112 and generate the instruction set profile 122 for each architectural instruction variant of the ISA 120. The multi-core processor system under analysis 112 can include at least one multi-core processor that is targeted by analysis at the processor and core level to determine a combination of instruction sequences 126 for a targeted processor of the multi-core processor system under analysis 112 from the instruction set profile 122 that corresponds to a desired stressmark type of the stressmark types 124. The desired stressmark type can define a metric representative of functionality of interest of the targeted multi-core processor. In the example of FIG. 1, the stressmark types 124 can include a range of noise stressmarks ranging from a no noise stressmark to a medium noise stressmark to a maximum noise stressmark.

The processing tool 114 may orchestrate an analysis process as well as perform pre and post processing operations on data generated by the micro-benchmark generator 116. The micro-benchmark generator 116 can develop benchmark data on a variety of performance metrics and on an instruction basis for an instruction or sequence of instructions. The micro-benchmark generator 116 may operate in a simulation environment that is configured with architecture and performance characteristics of the multi-core processor system under analysis 112 or may directly interface with a physical instance of the multi-core processor system under analysis 112 using instrumentation 134. The instrumentation 134 can include current monitors, voltage monitors, noise level monitors, and the like.

The processing tool 114 or other portion of the analysis tools 108 can define a set of workloads for the multi-core processor system under analysis 112 based on a plurality of metrics of interest to profile. The results of stressmark analysis for metrics such as power, noise level, instructions-per-cycle, etc. on a number of active cores basis can be used to identify which instruction sequences 126 or combinations of the instruction sequences 126 should be used to establish various stressmarks in the stressmark database 128. For instance, instruction sequences 126 resulting in no detectable noise level can be recorded in the stressmark database 128 for use when running tests or simulations with no noise desired. Similarly, instruction sequences 126 resulting in a mid-level of noise and a maximum level of noise can be recorded in the stressmark database 128. A record of noise level versus voltage or power level can be tracked based on a number of active cores in the worst case noise curves 130. Further details are provided herein.

FIG. 2 depicts an example of a multi-core processing system 200 according to an embodiment of the multi-core processor system under analysis 112 of FIG. 1. The multi-core processing system 200 can include multiple instances of a multi-core processor 202. FIG. 2 shows many processor cores 212A through 212N (generally referred to as cores 212 or processor cores 212) on one processor die or multi-core processor 202, connected with an interconnect 222, under management of an interconnect control (not shown). Each processor core 212 may have an instruction cache for caching instructions from memory to be executed and a data cache for caching data (operands) of memory locations to be operated on by the processor core 212. In an embodiment, caches of a plurality of multi-core processors 202 are interconnected to support cache coherency. The processor core 212 caches may include one level of caching in a hierarchical cache structure. For example, each multi-core processor 202 may employ a shared cache 228 to be shared among all or a subset of the processor cores 212 on the multi-core processor 202 between the multi-core processor 202 and main memory 226. Additionally, each processor core 212 may have its own L1 cache 224 directly on the processor core 212, where the L1 cache 224 is not shared among the different processor cores 212 but is a core-internal cache. Also, each processor core 212 may have one or more registers 230 for storing small amounts of data, status, and configuration information.

It is understood that the processor cores 212 are physical devices or simulated instances thereof that include all the circuitry (i.e., hardware along with firmware) necessary to execute instructions as understood by one skilled in the art.

Although the multi-core processor 202 includes multiple processor cores 212, various examples may be provided with reference to processor core 212A for ease of understanding and not limitation. It is understood that further details shown and discussed relative to processor core 212A apply by analogy to all processor cores 212, and these details may be included in all of the processor cores 212.

The processor core 212A is shown with four threads 210A, 210B, 210C, and 210D (also referred to as thread0, thread1, thread2, and thread3, and generally referred to as thread or threads 210), and each thread 210A-210D includes a separate sequence of instructions or instruction stream, such as a program or portion thereof that can be provided from the instruction sequences 126 of FIG. 1. Each processor core 212A-212N may be configured to support different levels of multi-threading, i.e., a different number of threads 210. In the example of FIG. 2, processor core 212A is configured to execute four threads 210A-210D in parallel, while processor core 212N executes threads 210A and 210B. A processor core 212 may be configured in a single thread mode or a higher order mode with a higher number of threads depending upon implementation.

At an architecture level, each thread 210 may represent an independent central processing unit (CPU). Instructions which the thread 210 has for execution by the processor core 212 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units, such as functional units 232A, 232B, . . . , 232M of each processor core 212 can be accessed in parallel by executing one or more of the instructions in a thread 210 using a processing pipeline and micro-operation sequencing. Functional units 232A-232M can include, for example, one or more fixed-point execution units, floating-point execution units, vector execution units, load/store units, branch control units, and the like.

A resource manager 234 is operable to monitor for requested changes in the number of active processor cores 212. The resource manager 234 is depicted generally in FIG. 2 but can be embodied in a hypervisor, operating system, and/or firmware. Alternatively, the resource manager 234 may reside in a separate processor that monitors and configures multi-core processor 202. The resource manager 234 can interface with a power control 236 to check a current power level setting of the multi-core processor 202. The resource manager 234 can also adjust the current power level setting using the power control 236. For example, the resource manager 234 can determine a targeted power level setting associated with a requested change in the number of active processor cores 212, where the targeted power level setting incorporates a worst case noise level margin defined on an active processor core basis. The worst case noise level margin is based on the worst case noise curves 130 as a function of the requested change in the number of active processor cores. The resource manager 234 can command the power control 236 to adjust the current power level setting to align with the targeted power level based on determining that the current power level setting fails to meet the targeted power level within a threshold band. The power control 236 can implement power changes as a frequency or voltage change, for instance.

Figure 3:
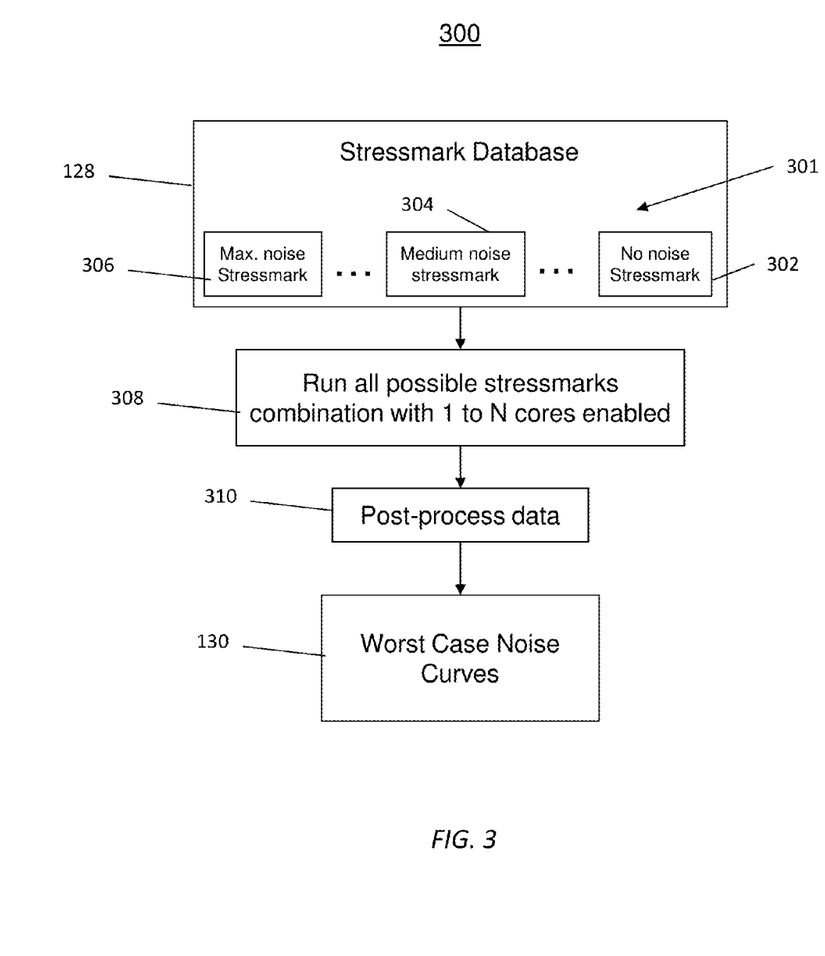
FIG. 3 illustrates a flow diagram of a worst case noise analysis process in accordance with an exemplary embodiment.

Referring now to FIG. 3, a flow chart diagram of a worst case noise analysis process 300 in accordance with an exemplary embodiment is shown. The example of FIG. 3 is described with respect to the example of FIGS. 1 and 2. The process 300 can be performed using one or more of the analysis tools 108 of FIG. 1. As shown in FIG. 3, the stressmark database 128 can include a range of noise stressmarks 301 ranging from a no noise stressmark 302 to a medium noise stressmark 304 to a maximum noise stressmark 306. At block 308, all possible stressmarks in the range of noise stressmarks 301 are run for all combinations of processor cores enabled and the results are collected. For instance, with respect to FIG. 2, all combinations of 1 to N processor cores 212 are enabled with each possible combination of the range of noise stressmarks 301 to generate analysis results. Thus, S stressmarks on N cores results in $N^S$ combinations. All combinations are valid because the physical location of the cores affects how the noise is generated.

Resulting data from block 308 can be post-processed in block 310 to summarize power and noise levels on a per active core basis into worst case noise curves 130. The worst case noise curves 130 may reveal that worst case noise depends on the number of active cores, with a greater noise level present when a higher number of cores are active. Maximum noise effects may be non-linear and not readily predictable due to results of circuit layout, interactions with neighboring cores, timing constraints, and other factors. The resulting data captured in the worst case noise curves 130 can be used to define a floor level from which a guard band is added to establish each targeted power level setting based on the number of cores presently active. A threshold band can be defined around each targeted power level to ensure that a guard band level above the worst case noise level is maintained while avoiding power settings that are much higher than needed (e.g., excessive margin). Finer granularity is each targeted power level may be achieved if there are substantial differences in noise level analysis results depending on which particular combination of cores is active (e.g., based on which specific core combination is active rather than simply how many cores are active).

Figure 4:
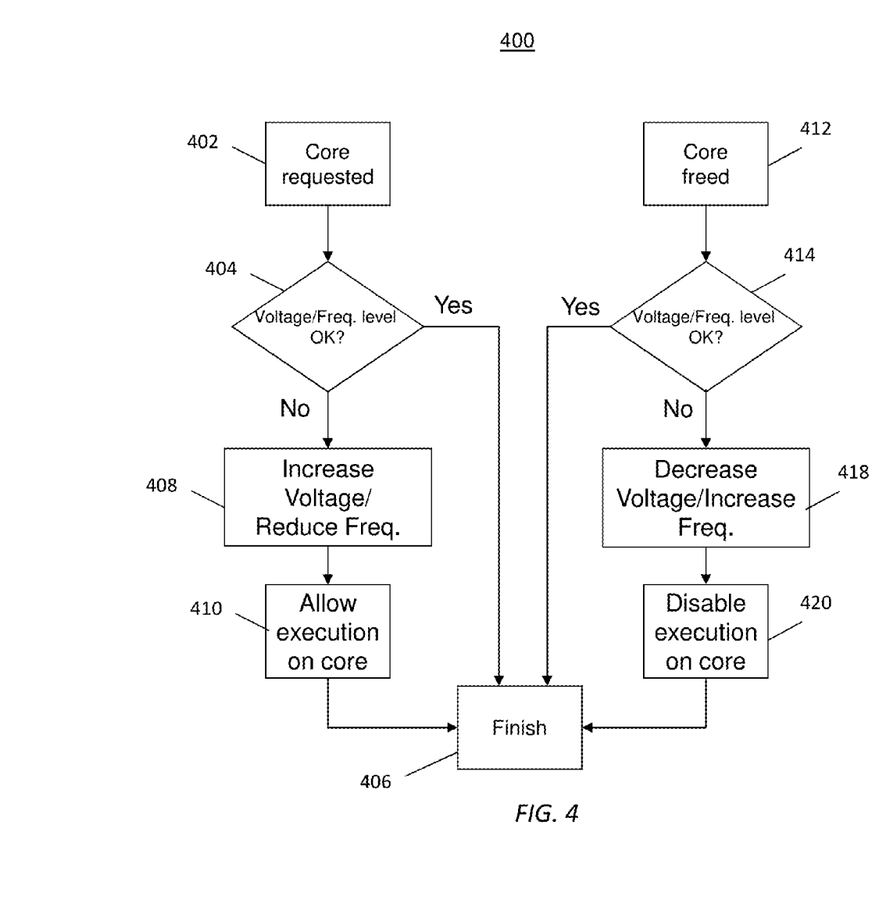
FIG. 4 illustrates a flow diagram of a method for adjusting a current power level setting based on a number of active cores in accordance with an exemplary embodiment.

Referring now to FIG. 4, a flow chart diagram of a method 400 for adjusting a current power level setting based on a number of active cores in accordance with an exemplary embodiment is shown. As previously described, the process 300 of FIG. 3 can be run to establish the targeted power level based on the worst case noise curves 130 of FIGS. 1 and 3. The method 400 can be performed by the resource manager 234 of FIG. 2.

As shown at block 402, when an additional core is requested, a check is performed at block 404 to determine whether the voltage and/or frequency level of the power control 236 of FIG. 2 is sufficient. The sufficiency check may be performed within a threshold band to ensure that there is sufficient margin without excessive margin. If the voltage and/or frequency level of the power control 236 of FIG. 2 is sufficient at block 404, then no adjustment is needed and the method 400 finishes at block 406. If the voltage and/or frequency level of the power control 236 of FIG. 2 is insufficient at block 404, then voltage is increased, frequency is reduced, or both at block 408. Once power adjustments have been made by the power control 236 of FIG. 2, execution on the additional core is allowed at block 410 and method 400 concludes at block 406.

As shown at block 412, when a core is requested to be freed, a check is performed at block 414 to determine whether the voltage and/or frequency level of the power control 236 of FIG. 2 is sufficient. The sufficiency check may be performed within a threshold band to ensure that there is sufficient margin without excessive margin after the core is disabled. If the voltage and/or frequency level of the power control 236 of FIG. 2 is sufficient at block 414, then no adjustment is needed and the method 400 finishes at block 406. If the voltage and/or frequency level of the power control 236 of FIG. 2 is insufficient at block 414, then voltage is decreased, frequency is increased, or both at block 418. Once power adjustments have been made by the power control 236 of FIG. 2, execution on the core is disabled at block 420 and method 400 concludes at block 406.

Figure 5:
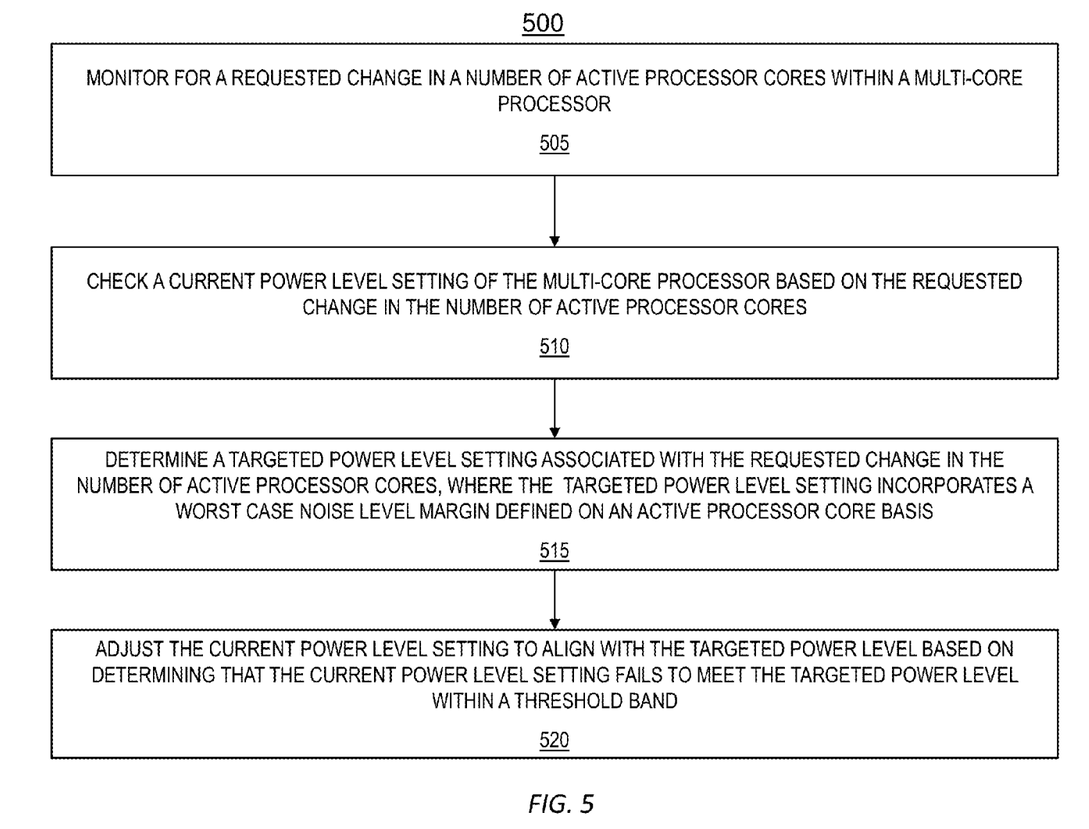
FIG. 5 illustrates a flow diagram of a method for idle-aware margin adaption in a multi-core processing system in accordance with an exemplary embodiment.

FIG. 5 illustrates a flow diagram of a method 500 for idle-aware margin adaption in a multi-core processing system in accordance with an exemplary embodiment. FIG. 5 is described in reference to FIGS. 1-4 and may be performed in an alternate order and include additional steps beyond those depicted in FIG. 5.

At block 505, resource manager 234 monitors for a requested change in a number of active processor cores 212 within the multi-core processor 202. At block 510, resource manager 234 checks a current power level setting of the multi-core processor 202 based on the requested change in the number of active processor cores 212.

At block 515, resource manager 234 determines a targeted power level setting associated with the requested change in the number of active processor cores 212, where the targeted power level setting incorporates a worst case noise level margin defined on an active processor core basis. The worst case noise level margin can be based on the worst case noise curves 130 as a function of the requested change in the number of active processor cores. For instance, a worst case noise level margin may be 150 millivolts at for four active cores but 100 millivolts for two active cores. As previously described, the worst case noise curves 130 may be determined based on running a plurality of possible stressmark combinations for the multi-core processor 202 with a varying number of cores 212 enabled in worst case noise analysis process 300. The possible stressmarks can be determined analytically based on the instruction set architecture 120 of the multi-core processor 202, and the possible stressmarks can be stored in the stressmark database 128. Selected values from the worst case noise curves 130 can be incorporated into targeted power level settings and used to define threshold bands as stored and used locally by the resource manager 234, Thus, the resource manager 234 need not interface with the analysis system 102 after the resource manager 234 is configured and deployed.

At block 520, resource manager 234 adjusts the current power level setting to align with the targeted power level based on determining that the current power level setting fails to meet the targeted power level within a threshold band. Based on determining that activation of an additional core 212 of the multi-core processor 202 has been requested, resource manager 234 can command the power control 236 to increase the current power level setting prior to allowing execution on the additional core 212. The current power level setting may be increased by initiating a voltage increase or a frequency reduction through the power control 236. Based on determining that a core 212 of the multi-core processor 202 has been requested to be freed, resource manager 234 can command the power control 236 to decrease the current power level setting and disable execution on the core 212. The current power level setting may be decreased by initiating a voltage decrease or a frequency increase.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   determining a plurality of possible stressmarks of a multi-core processor based on an instruction set architecture of the multi-core processor including a range of noise stressmarks from a no noise stressmark to a medium noise stressmark to a maximum noise stressmark;
   determining a plurality of worst case noise curves determined based on running all combinations of the range of noise stressmarks for the multi-core processor with a varying number of cores enabled in a worst case noise analysis process capturing effects of circuit layout and physical location, interactions with neighboring instances of active processor cores, and the instruction set architecture of the multi-core processor;
   monitoring for a requested change in a number of active processor cores within the multi-core processor during operation of the multi-core processor;
   checking a current power level setting of the multi-core processor based on the requested change in the number of active processor cores;

determining during operation of the multi-core processor, a targeted power level setting associated with the requested change in the number of active processor cores, wherein the targeted power level setting incorporates a noise guard band that is dynamically adjusted based on a worst case noise level margin defined on an active processor core basis, and the worst case noise level margin is based on the worst case noise curves as a function of the requested change in the number of active processor cores; and adjusting the current power level setting during operation of the multi-core processor to align with the targeted power level based on determining that the current power level setting fails to meet the targeted power level within a threshold band.

2. The method of claim 1, further comprising:

based on determining that activation of an additional core of the multi-core processor has been requested, increasing the current power level setting prior to allowing execution on the additional core.

3. The method of claim 2, wherein increasing the current power level setting comprises initiating a voltage increase and/or a frequency reduction.

4. The method of claim 1, further comprising:

based on determining that a core of the multi-core processor has been requested to be freed, decreasing the current power level setting and disabling execution on the core.

5. The method of claim 4, wherein decreasing the current power level setting comprises initiating a voltage decrease and/or a frequency increase.

6. A computer system comprising:

an analysis system comprising a processor operable to perform:

determining a plurality of possible stressmarks of a multi-core processor based on an instruction set architecture of the multi-core processor including a range of noise stressmarks from a no noise stressmark to a medium noise stressmark to a maximum noise stressmark; and determining a plurality of worst case noise curves determined based on running all combinations of the range of noise stressmarks for the multi-core processor with a varying number of cores enabled in a worst case noise analysis process capturing effects of circuit layout and physical location, interactions with neighboring instances of active processor cores, and the instruction set architecture of the multi-core processor;

the multi-core processor;

a power control; and a resource manager operable to perform a method comprising:

monitoring for a requested change in a number of active processor cores within the multi-core processor during operation of the multi-core processor;

checking a current power level setting of the multi-core processor based on the requested change in the number of active processor cores;

determining during operation of the multi-core processor, a targeted power level setting associated with the requested change in the number of active processor cores, wherein the targeted power level setting incorporates a noise guard band that is dynamically adjusted based on a worst case noise level margin defined on an active processor core basis, and the worst case noise level margin is based on the worst case noise curves as a function of the requested change in the number of active processor cores; and adjusting the current power level setting during operation of the multi-core processor using the power control to align the current power level setting with the targeted power level based on determining that the current power level setting fails to meet the targeted power level within a threshold band.

7. The computer system of claim 6, wherein based on determining that activation of an additional core of the multi-core processor has been requested, the resource manager commands the power control to increase the current power level setting prior to allowing execution on the additional core.

8. The computer system of claim 7, wherein the power control initiates a voltage increase and/or a frequency reduction in response to the resource manager.

9. The computer system of claim 6, wherein based on determining that a core of the multi-core processor has been requested to be freed, the resource manager commands the power control to decrease the current power level setting, and the resource manager disables execution on the core.

10. The computer system of claim 9, wherein the power control initiates a voltage decrease and/or a frequency increase in response to the resource manager.

11. A computer program product comprising a computer readable storage medium having program instructions embodied therewith, the program instructions executable by a processor to cause the processor to:

determine a plurality of possible stressmarks of a multi-core processor based on an instruction set architecture of the multi-core processor including a range of noise stressmarks from a no noise stressmark to a medium noise stressmark to a maximum noise stressmark; and determine a plurality of worst case noise curves determined based on running all combinations of the range of noise stressmarks for the multi-core processor with a varying number of cores enabled in a worst case noise analysis process capturing effects of circuit layout and physical location, interactions with neighboring instances of active processor cores, and the instruction set architecture of the multi-core processor; and program instructions executable by the multi-core processor to cause the multi-core processor to:

monitor for a requested change in a number of active processor cores within the multi-core processor during operation of the multi-core processor;

check a current power level setting of the multi-core processor based on the requested change in the number of active processor cores;

determine during operation of the multi-core processor, a targeted power level setting associated with the requested change in the number of active processor cores, wherein the targeted power level setting incorporates a noise guard band that is dynamically adjusted based on a worst case noise level margin defined on an active processor core basis, and the worst case noise level margin is based on the worst case noise curves as a function of the requested change in the number of active processor cores; and adjust the current power level setting during operation of the multi-core processor to align with the targeted power level based on determining that the current power level setting fails to meet the targeted power level within a threshold band.

12. The computer program product of claim 11, wherein the program instructions executable by the multi-core processor further cause the multi-core processor to increase the current power level setting prior to allowing execution on an additional core of the multi-core processor based on determining that activation of the additional core has been requested.

13. The computer program product of claim 12, wherein the increase of the current power level setting comprises initiating a voltage increase or a frequency reduction.

14. The computer program product of claim 11, wherein the program instructions executable by the multi-core processor further cause the multi-core processor to decrease the current power level setting and disable execution on a core of the multi-core processor based on determining that the core has been requested to be freed.

15. The method of claim 1, further comprising:
   performing a sufficiency check within the threshold band based on a change in the number of active processor cores; and
   maintaining the current power level setting during operation of the multi-core processor based on determining that the current power level setting meets an updated targeted power level associated with the change in the number of active processor cores within the threshold band.

* * * * *